United States Patent
Gong et al.

(10) Patent No.: US 9,362,836 B2
(45) Date of Patent: Jun. 7, 2016

(54) CIRCUIT FOR DRIVING SYNCHRONOUS RECTIFIER AND POWER SUPPLY APPARATUS INCLUDING THE SAME

(71) Applicant: SOLUM CO., LTD., Suwon-si (KR)

(72) Inventors: Jung Chul Gong, Suwon (KR); Jong Rok Kim, Suwon (KR); Ho Joon Jang, Suwon (KR); Hwan Cho, Suwon (KR)

(73) Assignee: SOLUM CO., LTD., Suwon (KR)

( * ) Notice: Subject to any disclaimer, the term of this patent is extended or adjusted under 35 U.S.C. 154(b) by 0 days.

(21) Appl. No.: 14/571,910

(22) Filed: Dec. 16, 2014

(65) Prior Publication Data

US 2015/0171728 A1 Jun. 18, 2015

(30) Foreign Application Priority Data

Dec. 17, 2013 (KR) .................. 10-2013-0156988

(51) Int. Cl.
*H02M 3/335* (2006.01)

(52) U.S. Cl.
CPC ........ *H02M 3/33592* (2013.01); *Y02B 70/1475* (2013.01)

(58) Field of Classification Search
CPC ............. Y02B 70/126; Y02B 70/1433; Y02B 70/1441; Y02B 70/1475; H02M 3/33507; H02M 3/33592; H02M 7/1557
USPC ............. 363/21.02, 21.03, 21.06, 88, 89, 127
See application file for complete search history.

(56) References Cited

U.S. PATENT DOCUMENTS

| | | | |
|---|---|---|---|
| 5,691,628 A * | 11/1997 | Martin | 323/237 |
| 8,134,851 B2 * | 3/2012 | Soldano et al. | 363/127 |
| 2008/0309162 A1 | 12/2008 | Ma et al. | |
| 2008/0310203 A1 * | 12/2008 | Yang et al. | 363/126 |
| 2009/0040792 A1 * | 2/2009 | Yang et al. | 363/21.06 |
| 2009/0091960 A1 * | 4/2009 | Yang | 363/127 |
| 2009/0109715 A1 * | 4/2009 | Yang et al. | 363/89 |
| 2010/0103704 A1 * | 4/2010 | Adragna et al. | 363/21.02 |
| 2010/0156366 A1 | 6/2010 | Sakai et al. | |
| 2014/0192575 A1 * | 7/2014 | Olivik et al. | 363/89 |

FOREIGN PATENT DOCUMENTS

| | | |
|---|---|---|
| KR | 10-2008-0026586 | 3/2008 |
| KR | 10-2008-0110470 | 12/2008 |
| KR | 10-0963024 | 6/2010 |

* cited by examiner

*Primary Examiner* — Adolf Berhane (57) ABSTRACT

A circuit for driving a synchronous rectifier may include a voltage level detecting unit detecting a voltage level of the synchronous rectifier; an on/off signal generating unit generating an on signal controlling the synchronous rectifier to be turned on when the voltage level detected by the voltage level detecting unit is decreased to a voltage level equal to or less than a preset reference voltage level, and generating an off signal controlling the synchronous rectifier to be turned off when the voltage level detected by the voltage level detecting unit is increased to a voltage level exceeding the reference voltage level; a minimum time determining unit controlling the synchronous rectifier to be turned on during a preset first period; and a blanking time determining unit controlling the synchronous rectifier so as not to be turned on during a preset second period after the synchronous rectifier has been turned off.

15 Claims, 5 Drawing Sheets

CIRCUIT FOR DRIVING SYNCHRONOUS RECTIFIER AND POWER SUPPLY APPARATUS INCLUDING THE SAME

CROSS-REFERENCE TO RELATED APPLICATION

This application claims the benefit of Korean Patent Application No. 10-2013-0156988 filed on Dec. 17, 2013, with the Korean Intellectual Property Office, the disclosure of which is incorporated herein by reference.

BACKGROUND

The present disclosure relates to a circuit for driving a synchronous rectifier and a power supply apparatus including the same.

Recently, converters have been widely used in a great many electrical, electronic, and communication devices such as notebook computers, personal computers, and the like. Such converters have advantages, in that a power supply circuit may be miniaturized and manufacturing costs thereof may be reduced.

However, as the levels of performance of recent electric and electronic devices have gradually increased while degrees of power capacity thereof have concurrently increased, in a power structure in which a rectifying diode is used as a secondary rectifier of the converter, voltage drop loss may be significant due to the rectifying diode, and as a result, overall power circuit efficiency may be degraded. In order to solve these problems, a synchronous rectifier having a high degree of power efficiency has been employed as the secondary rectifier.

However, in the case of using the synchronous rectifier as the secondary rectifier, if a soft load is applied to an output terminal of the converter, the synchronous rectifier may malfunction due to a resonance phenomenon, or the like.

RELATED ART DOCUMENT

Patent Document (Patent Document 1) Korean Patent Laid-Open Publication No. 10-2008-0110470

SUMMARY

An exemplary embodiment in the present disclosure may provide a circuit for driving a synchronous rectifier capable of controlling the synchronous rectifier so as not to be turned on during a preset period after the synchronous rectifier has been turned off, and a power supply apparatus including the same.

According to an exemplary embodiment in the present disclosure, a circuit for driving a synchronous rectifier may include: a voltage level detecting unit detecting a voltage level in at least one node of the synchronous rectifier; an on/off signal generating unit generating an on signal controlling the synchronous rectifier to be turned on when the voltage level detected by the voltage level detecting unit is decreased to a voltage level equal to or less than a preset reference voltage level, and generating an off signal controlling the synchronous rectifier to be turned off when the voltage level detected by the voltage level detecting unit is increased to a voltage level exceeding the reference voltage level; a minimum time determining unit controlling the synchronous rectifier to be turned on during a preset first period; and a blanking time determining unit controlling the synchronous rectifier so as not to be turned on during a preset second period after the synchronous rectifier has been turned off.

The minimum time determining unit may receive the on/off signal from the on/off signal generating unit and change the off signal based on the on signal.

The blanking time determining unit may receive the on/off signal from the minimum time determining unit and change the on signal based on the off signal.

The circuit may further include a gate signal generating unit generating a gate signal driving the synchronous rectifier depending on the on/off signal transmitted from the blanking time determining unit.

The minimum time determining unit may remove at least one off signal received before the first period has elapsed after receiving the on signal from the on/off signal generating unit, and generate a new off signal immediately after the first period has elapsed.

The blanking time determining unit may remove at least one on signal received before the second time has elapsed after receiving the off signal from the minimum time determining unit.

The gate signal generating unit may control the synchronous rectifier to be turned on at a rising edge of the on signal transmitted from the blanking time determining unit, and control the synchronous rectifier to be turned off at a rising edge of the off signal transmitted from the blanking time determining unit.

According to an exemplary embodiment in the present disclosure, a power supply apparatus may include: a circuit for converting power switching an input voltage induced into a primary winding to induce the switched input voltage into a secondary winding which is electrically insulated from the primary winding, and rectifying the voltage induced into the secondary winding to generate an output voltage; and a circuit for driving a synchronous rectifier controlling an operation of the synchronous rectifier by detecting a voltage level in one node of the secondary winding to rectify the voltage induced into the secondary winding, wherein the circuit for driving the synchronous rectifier controls the synchronous rectifier to be turned on during a preset first period and controls the synchronous rectifier so as not to be turned on during a preset second period after the synchronous rectifier has been turned off.

The circuit for converting power may include: a transforming unit including the primary winding to which the input voltage is applied and the secondary winding formed to be electrically insulated from the primary winding; a switching unit switching the input voltage applied to the primary winding; an output unit connected to a first node of the secondary winding and generating the output voltage from the voltage induced into the secondary winding; and the synchronous rectifier connected to a second node of the secondary winding and rectifying the voltage induced into the secondary winding.

The circuit for driving the synchronous rectifier may include: a voltage level detecting unit detecting a voltage level in a connection node between the synchronous rectifier and the secondary winding; an on/off signal generating unit generating an on signal controlling the synchronous rectifier to be turned on when the voltage level detected by the voltage level detecting unit is decreased to a voltage level equal to or less than a preset reference voltage level, and generating an off signal controlling the synchronous rectifier to be turned off when the voltage level detected by the voltage level detecting unit is increased to a voltage level exceeding the reference voltage level; a minimum time determining unit controlling the synchronous rectifier to be turned on during the preset first period; and a blanking time determining unit controlling the synchronous rectifier so as not to be turned on during the preset second period after the synchronous rectifier has been turned off.

The minimum time determining unit may receive the on/off signal from the on/off signal generating unit and change the off signal based on the on signal.

The blanking time determining unit may receive the on/off signal from the minimum time determining unit and change the on signal based on the off signal.

The circuit may further include a gate signal generating unit generating a gate signal driving the synchronous rectifier depending on the on/off signal transmitted from the blanking time determining unit.

The minimum time determining unit may remove at least one off signal received before the first period has elapsed after receiving the on signal from the on/off signal generating unit, and generate a new off signal immediately after the first period has elapsed.

The blanking time determining unit may remove at least one on signal received before the second period has elapsed after receiving the off signal from the minimum time determining unit.

The gate signal generating unit may control the synchronous rectifier to be turned on at a rising edge of the on signal transmitted from the blanking time determining unit, and control the synchronous rectifier to be turned off at a rising edge of the off signal transmitted from the blanking time determining unit.

BRIEF DESCRIPTION OF THE DRAWINGS

The above and other aspects, features and other advantages in the present disclosure will be more clearly understood from the following detailed description taken in conjunction with the accompanying drawings, in which.

DETAILED DESCRIPTION

Hereinafter, embodiments in the present disclosure will be described in detail with reference to the accompanying drawings.

The disclosure may, however, be embodied in many different forms and should not be construed as being limited to the embodiments set forth herein. Rather, these embodiments are provided so that this disclosure will be thorough and complete, and will fully convey the scope of the disclosure to those skilled in the art.

In the drawings, the shapes and dimensions of elements may be exaggerated for clarity, and the same reference numerals will be used throughout to designate the same or like elements.

Figure 1:
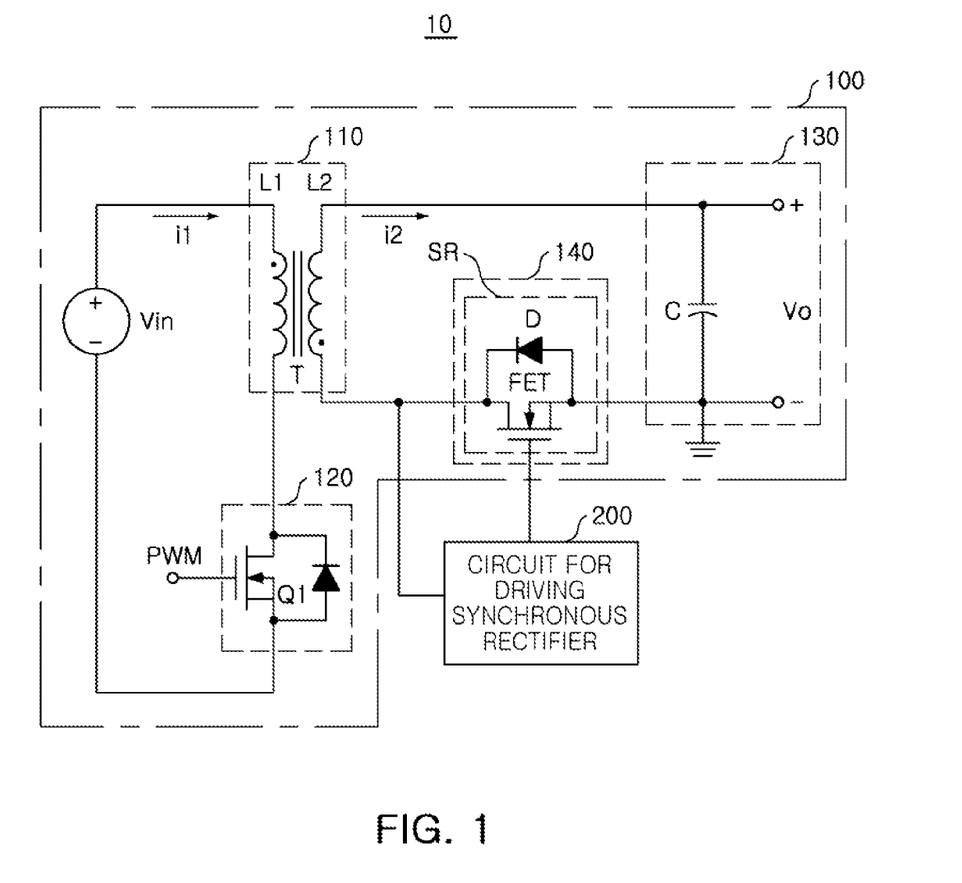
FIG. 1 is a schematic circuit diagram of a power supply apparatus according to an exemplary embodiment in the present disclosure.

FIG. 1 is a schematic circuit diagram of a power supply apparatus according to an exemplary embodiment in the present disclosure. A power supply apparatus 10 according to an exemplary embodiment in the present disclosure may include a circuit 100 for converting power and a circuit 200 for driving a synchronous rectifier.

The circuit 100 for converting power may include a transforming unit 110, a switching unit 120, an output unit 130, and a rectifying unit 140. The transforming unit 110 may include a transformer T having a primary winding L1 and a secondary winding L2 which are electrically insulated, the switching unit 120 may include a switch Q1 which is operated by a pulse width modulation (PWM) signal, and the output unit 130 may include a capacitor C connected in parallel with an output terminal thereof.

The rectifying unit 140, which rectifies a voltage induced into the secondary winding L2 of the transformer, may include a synchronous rectifier SR. The synchronous rectifier SR may include a transistor FET and a diode D, wherein the diode D of the synchronous rectifier SR may be separately added to the transistor FET or may be additionally produced in a process of manufacturing the transistor FET. The synchronous rectifier is provided to reduce power loss by using a switch having low conduction resistance instead of a rectifying diode in order to reduce power loss due to voltage drop in a secondary rectifying diode in a scheme using the rectifying diode as the secondary rectifier. Hereinafter, on/off switching of the synchronous rectifier SR will be described as having the same meaning as that of on/off switching of the transistor FET for convenience of explanation.

The first winding L1 and the switch Q1 may be connected in series with each other, one end of the secondary winding L2 may be connected to one end of the capacitor C, and the other end of the capacitor may be connected to a ground. In addition, one end of the synchronous rectifier SR may be connected to the other end of the capacitor C, and the other end of the synchronous rectifier SR may be connected to the other end of the second winding L2.

The circuit 200 for driving the synchronous rectifier may detect a voltage $V_{SR}$ and control an on/off operation of the transistor FET of the synchronous rectifier SR, wherein the circuit 200 for driving the synchronous rectifier may control the transistor FET of the synchronous rectifier SR to be turned on when the voltage $V_{SR}$ is decreased to a voltage level equal to or less than preset reference voltage level, and control the transistor FET of the synchronous rectifier SR to be turned off when the voltage $V_{SR}$ is increased to a voltage exceeding the preset reference voltage level.

In this case, the circuit 200 for driving the synchronous rectifier may enable the transistor FET of the synchronous rectifier SR to be turned on during a first period which is minimally preset when the transistor FET of the synchronous rectifier SR is turned on in order to prevent the transistor FET of the synchronous rectifier SR from being immediately turned off due to noise, or the like after the transistor FET of the synchronous rectifier SR is turned on.

Figure 2:
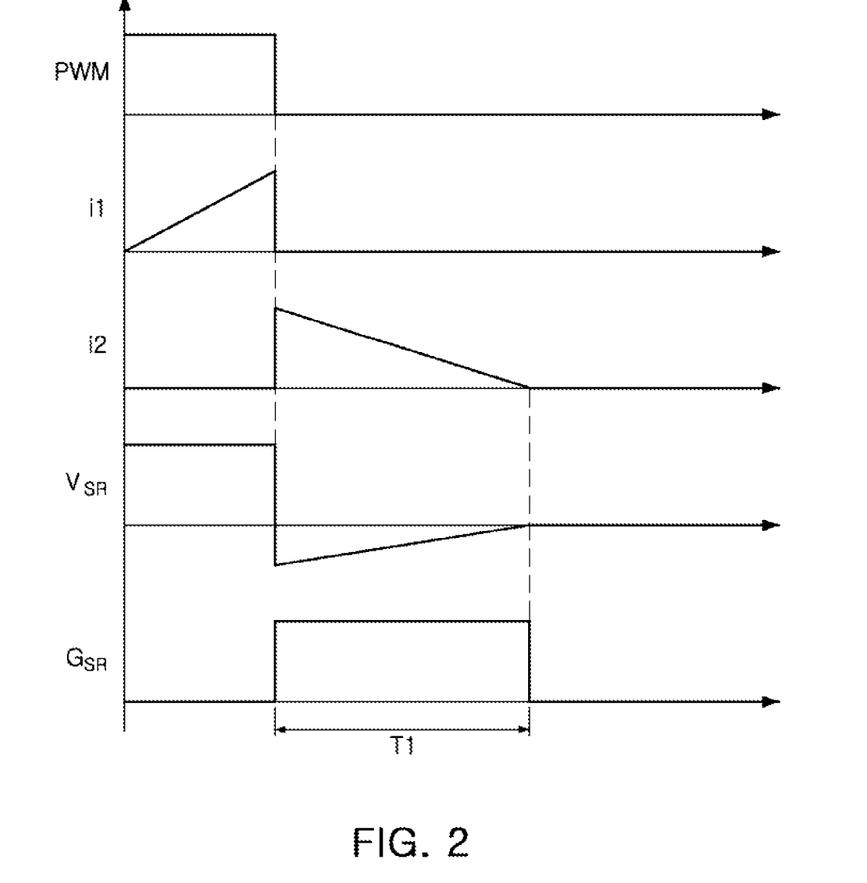
FIG. 2 is waveform diagrams of main parts of the power supply apparatus according to an exemplary embodiment in the present disclosure.

FIG. 2 is waveform diagrams of main parts of the power supply apparatus according to an exemplary embodiment in the present disclosure. Hereinafter, an operation of the power supply apparatus according to an exemplary embodiment in the present disclosure will be described with reference to FIGS. 1 and 2.

The switch Q1 may perform a switching operation in response to the PWM signal. If the PWM signal has a high level, the switch Q1 may be turned on, and if the PWM signal has a low level, the switch Q1 may be turned off.

If the switch Q1 is turned on by applying the PWM signal of the high level, a primary current i1 flows, such that a voltage depending on an input voltage Vin may be induced into the primary winding L1. In this case, the synchronous rectifier SR may be in a turned-off state.

Next, if the switch Q1 has been turned off by applying the PWM signal of the low level, the voltage induced into the primary winding L1 is induced into the secondary winding L2, wherein the voltage induced into the secondary winding L2 may be determined depending on a winding ratio of the first winding L1 and the second winding L2. A secondary current i2 flows by the voltage induced into the secondary winding L2, such that the capacitor C may be charged and an output voltage Vo may be generated.

The secondary current i2 flows into the diode D of the synchronous rectifier SR, and the voltage $V_{SR}$ may have a negative threshold voltage value (about, −0.7V) due to a threshold voltage of the diode D. In this case, if the preset reference voltage level of the circuit 200 for driving the synchronous rectifier is set to be larger than the above-mentioned negative threshold voltage value, the circuit 200 for driving the synchronous rectifier may generate a gate signal $G_{SR}$ of a high level to be turned on during a first period T1. In this case, the first period T1 may be set to a time during which a level of the secondary current i2 may be sufficiently decreased.

The transistor FET may be turned on by the gate signal $G_{SR}$ of the high level, and as the secondary current i2 is decreased, the voltage $V_{SR}$ may be gradually increased.

Figure 3:
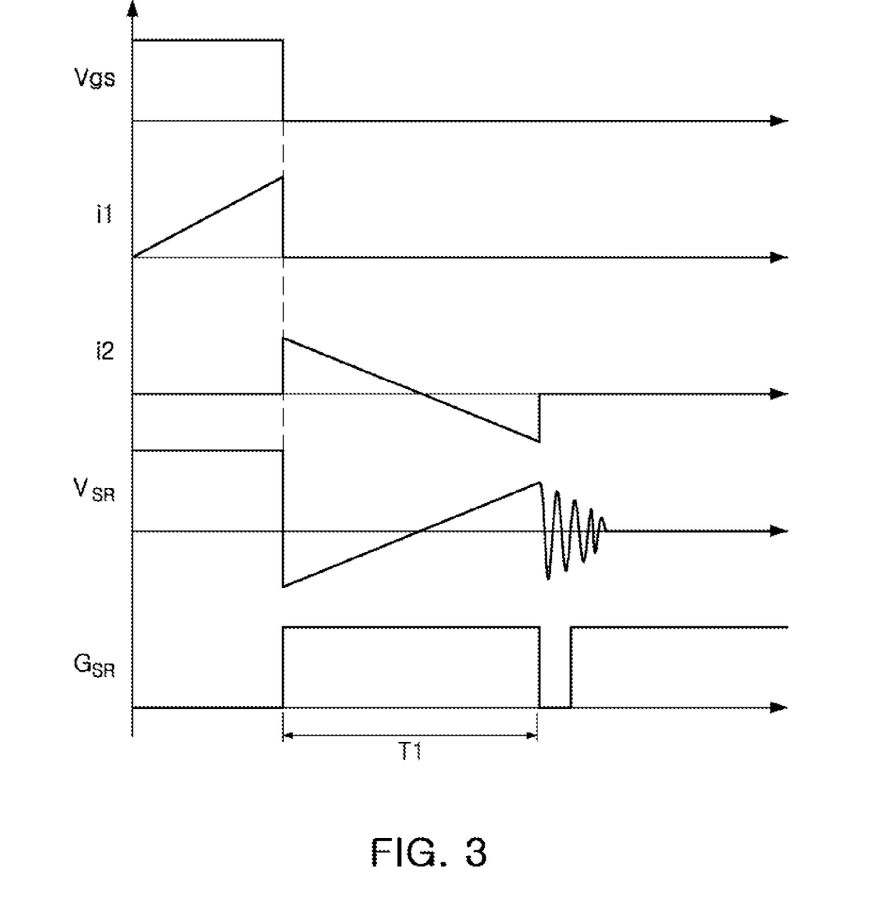
FIG. 3 is waveform diagrams of the main parts when a soft load is applied to an output terminal of the power supply apparatus.

FIG. 3 is waveform diagrams of the main parts when a soft load is applied to an output terminal of the power supply apparatus. When comparing FIGS. 2 and 3, it may be appreciated that the secondary current i2 flows backward. In general, the power supply apparatus may be designed so that various kinds of loads may be applied thereto. When the soft load is applied to an output terminal, the secondary current i2 rapidly charges the capacitor C, such that the current i2 may flow backward by a charge voltage of the capacitor C during the remaining first period.

In the case in which the secondary current i2 flows backward, the voltage $V_{SR}$ may also be gradually increased to a positive value. In the case in which the first period is terminated during the course in which the voltage $V_{SR}$ is increased and the transistor FET has been turned off, such that the resonance phenomenon may occur, thereby occurring malfunctions such as the transistor FET being again turned on during the first period, and the like.

According to the present exemplary embodiment, the above-mentioned problem may be solved by setting a blanking time by the circuit 200 for driving the synchronous rectifier.

Figure 4:
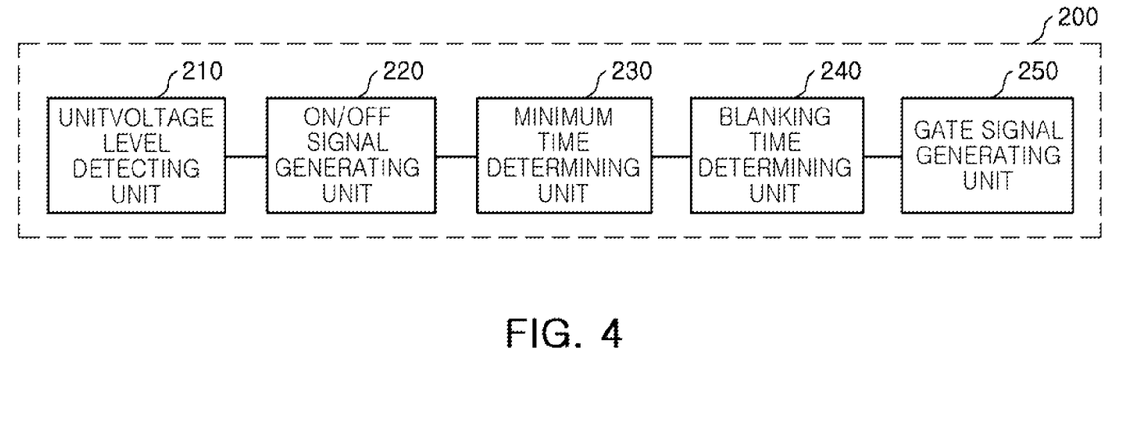
FIG. 4 is a block diagram of a circuit for driving a synchronous rectifier according to an exemplary embodiment in the present disclosure.

FIG. 4 is a block diagram of a circuit for driving a synchronous rectifier according to an exemplary embodiment in the present disclosure. Hereinafter, an operation of the circuit 200 for driving the synchronous rectifier according to the present exemplary embodiment will be described with reference to FIGS. 1 through 4.

Referring to FIG. 4, the circuit 200 for driving the synchronous rectifier may include a voltage level detecting unit 210, an on/off signal generating unit 220, a minimum time determining unit 230, a blanking time determining unit 240, and a gate signal generating unit 250.

The voltage level detecting unit 210 may detect the voltage $V_{SR}$ and provide the detected voltage $V_{SR}$ to the gate signal generating unit 220 by including a predetermined voltage element.

The on/off signal generating unit 220 may generate an on signal when the voltage $V_{SR}$ is decreased to a voltage level equal to or less than a preset reference voltage level, and generate an off signal when the voltage $V_{SR}$ is increased to a value exceeding the preset reference voltage level, to thereby provide the on/off signal to the minimum time determining unit 230.

The minimum time determining unit 230 may change the off signal based on the on signal by setting a minimum time in order to prevent the transistor FET from being immediately turned off due to noise, or the like after the transistor FET is turned on. Specifically, in the case in which at least one off signal is transmitted to the minimum time determining unit 230 before the first period has elapsed after receiving the on signal, the minimum time determining unit 230 may remove the at least one off signal received before the first period has elapsed and may generate a new off signal immediately after the first period has elapsed.

The blanking time determining unit 240 may change the on/off signal transmitted from the minimum time determining unit 230 by setting a blanking time in order to prevent the transistor FET from being immediately turned on due to resonance upon application of the soft load after the transistor FET has been turned off. Specifically, in the case in which at least one on signal is transmitted to the blanking time determining unit 240 before a second period has elapsed after receiving the off signal, the blanking time determining unit 240 may remove the at least one on signal received before the second period has elapsed.

The gate signal generating unit 250 may generate a gate signal depending on the on/off signal transmitted from the blanking time determining unit 240 and may provide the gate signal to the transistor FET of the synchronous rectifier SR.

Figure 5:
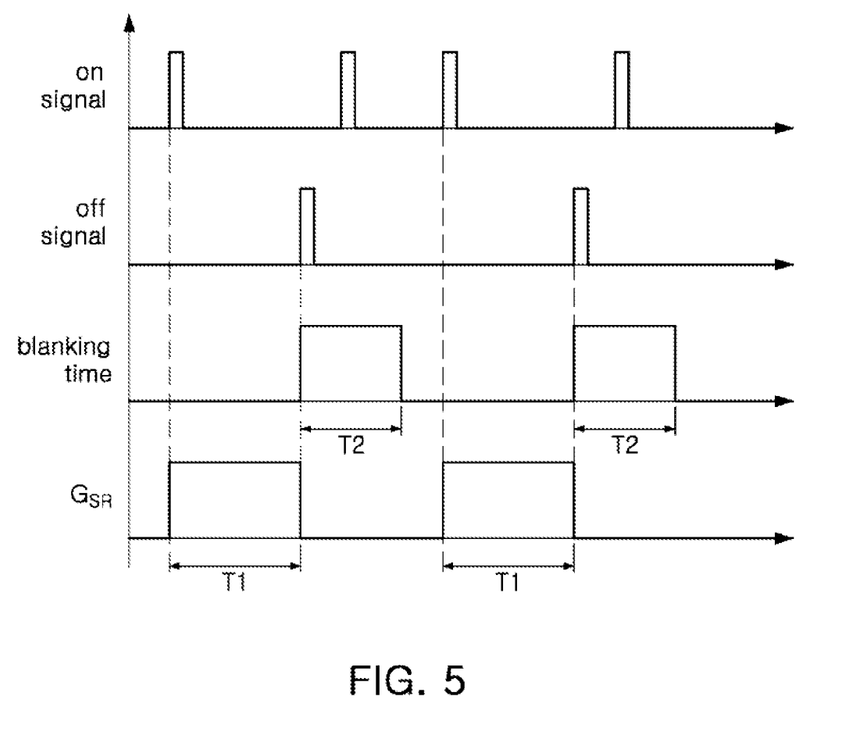
FIG. 5 is waveform diagrams of main parts of the circuit for driving the synchronous rectifier according to an exemplary embodiment in the present disclosure.

FIG. 5 is waveform diagrams of main parts of the circuit for driving the synchronous rectifier according to an exemplary embodiment in the present disclosure.

In FIG. 5, the on/off signal may be a signal transmitted from the minimum time determining unit 230 to the blanking time determining unit 240, and the gate signal $G_{SR}$ may be a signal which is generated by the gate signal generating unit 250. The blanking time may mean a time which is set by the blanking time determining unit 240 in order to remove the on signal received before the second period T2 has elapsed after receiving the off signal.

In FIG. 5, first and third on signals are assumed to be signals which are generated by a normal operation, and second and fourth on signals are assumed to be signals which are generated by malfunctioning due to resonance.

The blanking time determining unit 240 may set a blanking time during the second period after receiving the off signal. Since the on signal received during the blanking time is removed, the second and fourth on signals may be removed. Therefore, the gate signal generating unit 250 may generate the gate signal $G_{SR}$ depending on the remaining on/off signal.

According to the present exemplary embodiment as described above, malfunctioning of the synchronous rectifier SR due to resonance, or the like, may be prevented by setting the blanking time.

As set forth above, according to exemplary embodiments in the present disclosure, malfunctioning of the synchronous rectifier due to resonance, or the like may be prevented by controlling the synchronous rectifier so as not to be turned on during the preset period after the synchronous rectifier has been turned off.

While exemplary embodiments have been shown and described above, it will be apparent to those skilled in the art that modifications and variations could be made without departing from the scope in the present invention as defined by the appended claims.

What is claimed is:

1. A circuit for driving a synchronous rectifier, the circuit comprising:
   a voltage level detecting unit configured to detect a voltage level of the synchronous rectifier;
   an on/off signal generating unit configured to generate an on signal controlling the synchronous rectifier to be turned on when the voltage level detected by the voltage level detecting unit is decreased to a voltage level equal to or less than a preset reference voltage level, and configured to generate an off signal controlling the synchronous rectifier to be turned off when the voltage level detected by the voltage level detecting unit is increased to a voltage level exceeding the reference voltage level;
   a minimum time determining unit configured to control the synchronous rectifier to be turned on first period during a preset first period, remove at least one off signal received before the first period has elapsed after receiving the on signal from the on/off signal generating unit, and generate a new off signal immediately after the first period has elapsed; and
   a blanking time determining unit configured to control the synchronous rectifier so as not to be turned on during a preset second period after the synchronous rectifier has been turned off.

2. The circuit of claim 1, wherein the minimum time determining unit receives the on/off signal from the on/off signal generating unit and changes the off signal based on the on signal.

3. The circuit of claim 2, wherein the blanking time determining unit receives the on/off signal from the minimum time determining unit and changes the on signal based on the off signal.

4. The circuit of claim 3, further comprising a gate signal generating unit generating a gate signal driving the synchronous rectifier depending on the on/off signal transmitted from the blanking time determining unit.

5. The circuit of claim 3, wherein the blanking time determining unit removes at least one on signal received before the second period has elapsed after receiving the off signal from the minimum time determining unit.

6. The circuit of claim 4, wherein the gate signal generating unit controls the synchronous rectifier to be turned on at a rising edge of the on signal transmitted from the blanking time determining unit, and controls the synchronous rectifier to be turned off at a rising edge of the off signal transmitted from the blanking time determining unit.

7. A power supply apparatus, comprising:
   a circuit configured to convert power switching an input voltage induced into a primary winding to induce the switched input voltage into a secondary winding which is electrically insulated from the primary winding, and rectify the voltage induced into the secondary winding to generate an output voltage; and
   a circuit configured to drive a synchronous rectifier controlling an operation of the synchronous rectifier by detecting a voltage level of the secondary winding to rectify the voltage induced into the secondary winding, wherein
   the circuit configured to drive the synchronous rectifier controls the synchronous rectifier to be turned on during a preset first period and controls the synchronous rectifier so as not to be turned on during a preset second period after the synchronous rectifier has been turned off, and includes a minimum time determining unit controlling the synchronous rectifier to be turned on during the preset first period, and
   the minimum time determining unit removes at least one off signal received before the first period has elapsed after receiving the on signal from the on/off signal generating unit, and generates a new off signal immediately after the first period has elapsed.

8. The power supply apparatus of claim 7, wherein the circuit configured to convert power includes:
   a transforming unit including the primary winding to which the input voltage is applied and the secondary winding formed to be electrically insulated from the primary winding;
   a switching unit configured to control the input voltage applied to the primary winding;
   an output unit connected to a first node of the secondary winding and configured to generate the output voltage from the voltage induced into the secondary winding; and
   the synchronous rectifier connected to a second node of the secondary winding and configured to rectify the voltage induced into the secondary winding.

9. The power supply apparatus of claim 8, wherein the circuit for driving the synchronous rectifier further includes:
   a voltage level detecting unit configured to detect a voltage level in a connection node between the synchronous rectifier and the secondary winding;
   an on/off signal generating unit configured to generate an on signal controlling the synchronous rectifier to be turned on when the voltage level detected by the voltage level detecting unit is decreased to a voltage level equal to or less than a preset reference voltage level, and generate an off signal controlling the synchronous rectifier to be turned off when the voltage level detected by the voltage level detecting unit is increased to a voltage level exceeding the reference voltage level; and
   a blanking time determining unit configured to control the synchronous rectifier so as not to be turned on during the preset second period after the synchronous rectifier has been turned off.

10. The power supply apparatus of claim 9, wherein the minimum time determining unit receives the on/off signal from the on/off signal generating unit and changes the off signal based on the on signal.

11. The power supply apparatus of claim 10, wherein the blanking time determining unit receives the on/off signal from the minimum time determining unit and changes the on signal based on the off signal.

12. The power supply apparatus of claim 11, further comprising a gate signal generating unit generating a gate signal driving the synchronous rectifier depending on the on/off signal transmitted from the blanking time determining unit.

13. The power supply apparatus of claim 10, wherein the blanking time determining unit removes at least one on signal received before the second time has elapsed after receiving the off signal from the minimum time determining unit.

14. The power supply apparatus of claim 11, wherein the gate signal generating unit controls the synchronous rectifier to be turned on at a rising edge of the on signal transmitted from the blanking time determining unit, and controls the synchronous rectifier to be turned off at a rising edge of the off signal transmitted from the blanking time determining unit.

15. A power supply apparatus, comprising:
   a circuit configured to convert power switching an input voltage induced into a primary winding to induce the switched input voltage into a secondary winding which is electrically insulated from the primary winding, and rectifying the voltage induced into the secondary winding to generate an output voltage, the circuit configured to convert power including
- a transforming unit including the primary winding to which the input voltage is applied and the secondary winding formed to be electrically insulated from the primary winding,
- a switching unit configured to control the input voltage applied to the primary winding,
- an output unit connected to a first node of the secondary winding and configured to generate the output voltage from the voltage induced into the secondary winding, and
- the synchronous rectifier connected to a second node of the secondary winding and configured to rectify the voltage induced into the secondary winding; and a circuit configured to drive a synchronous rectifier controlling an operation of the synchronous rectifier by detecting a voltage level of the secondary winding to rectify the voltage induced into the secondary winding, wherein the circuit configured to to drive the synchronous rectifier controls the synchronous rectifier to be turned on during a preset first period and controls the synchronous rectifier so as not to be turned on during a preset second period after the synchronous rectifier has been turned off, and includes

- a voltage level detecting unit configured to detect a voltage level in a connection node between the synchronous rectifier and the secondary winding,
- an on/off signal generating unit configured to generate an on signal controlling the synchronous rectifier to be turned on when the voltage level detected by the voltage level detecting unit is decreased to a voltage level equal to or less than a preset reference voltage level, and generate an off signal controlling the synchronous rectifier to be turned off when the voltage level detected by the voltage level detecting unit is increased to a voltage level exceeding the reference voltage level,
- a minimum time determining unit controlling the synchronous rectifier to be turned on during the preset first period, and
- a blanking time determining unit configured to control the synchronous rectifier so as not to be turned on during the preset second period after the synchronous rectifier has been turned off.

\* \* \* \* \*